(12) United States Patent
Qin et al.

(10) Patent No.: US 7,149,559 B2
(45) Date of Patent: Dec. 12, 2006

(54) REPLACEABLE PANEL DEVICE FOR A HANDSET

(75) Inventors: Shui Yuan Qin, Shenzhen (CH); Chia-Hua Chen, Tu-chen (TW); XingHuang Luo, Shenzhen (CH); Jian Wu Chen, Shenzhen (CH)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 323 days.

(21) Appl. No.: 10/889,805

(22) Filed: Jul. 12, 2004

(65) Prior Publication Data

US 2005/0009588 A1 Jan. 13, 2005

(51) Int. Cl.
*H04M 1/00* (2006.01)

(52) U.S. Cl. .............................. 455/575.8; 455/575.1; 455/90.3; 379/433.01; 379/433.11; 379/437

(58) Field of Classification Search ............... 455/66.1, 455/90.3, 550.1, 575.1, 575.3, 575.4, 575.5, 455/575.6, 575.8; 379/433.01, 433.04, 433.05, 379/433.07, 433.11, 433.13, 433.12, 437, 379/440, 450, 451
See application file for complete search history.

(56) References Cited

U.S. PATENT DOCUMENTS

| | | | | |
|---|---|---|---|---|
| 5,745,566 A * | 4/1998 | Petrella et al. ......... | 379/433.13 |
| 5,848,152 A * | 12/1998 | Slipy et al. ............. | 379/433.13 |
| 5,982,881 A * | 11/1999 | Mischenko ............ | 379/433.11 |
| 6,614,905 B1* | 9/2003 | Kristensen .................. | 379/368 |
| 6,898,283 B1* | 5/2005 | Wycherley et al. .... | 379/433.11 |
| 2002/0037738 A1* | 3/2002 | Wycherley et al. ......... | 455/550 |
| 2004/0023702 A1* | 2/2004 | Pan et al. ................. | 455/575.8 |
| 2004/0102230 A1* | 5/2004 | Nuovo ..................... | 455/575.1 |
| 2004/0253998 A1* | 12/2004 | Dunleavy et al. ......... | 455/575.1 |
| 2005/0013434 A1* | 1/2005 | Qin et al. .............. | 379/433.12 |
| 2005/0130721 A1* | 6/2005 | Gartrell ................... | 455/575.8 |
| 2005/0130722 A1* | 6/2005 | Eriksson et al. ......... | 455/575.8 |

* cited by examiner

*Primary Examiner*—Duc Nguyen
*Assistant Examiner*—Anthony S. Addy
(74) *Attorney, Agent, or Firm*—Wei Te Chung

(57) ABSTRACT

A replaceable panel device has a panel (20), a locking subassembly (30) and a top cover (40). The panel is mounted on the top cover by the locking subassembly. The panel has a mounting hole (24) with a first arc groove (244). The locking subassembly is accommodated in the mounting hole of the panel and has a button (31) with a locking portion (314) and a spring (32). Two ends of the spring respectively contact with a particular portion of the mounting hole and the button. The top cover has a second arc groove (45) which corresponds with the first arc groove of the panel. The locking portion of the button passes through the first groove of the panel and the second groove of the top cover, and mates with the second arc groove by a return force of the spring to fix the panel and the top cover together.

27 Claims, 8 Drawing Sheets

REPLACEABLE PANEL DEVICE FOR A HANDSET

BACKGROUND OF THE INVENTION

1. Field of the Invention

The present invention generally relates to replaceable panel devices, and more particularly to a replaceable panel device used in portable electrical apparatuses, such as handset and PDA.

2. Description of Prior Art

Portable electrical apparatuses, such as handset and PDA, are widely used by users. There is a need to provide a handset with a replaceable panel to personal users' handset.

A conventional replaceable panel device is used in Alcatel OT310 type handset. A panel is mounted on a body of a handset by the replaceable panel device. The panel has a clasp extending from an end thereof. A plurality of clips extend from two side of the panel. The body of the handset has a clasp hole and a plurality of clip holes defined thereon. The panel is mounted on the body of the handset by the mate of the clasp and the clasp hole and of the clips and the clip holes. When a user wants the panel separate form the body of the handset, a force is enforced on a portion of the panel where the clasp is located, and draws the panel detach from the body of the handset.

However, the panel of the conventional replaceable panel device is separated from the body of the handset by a force. It is hard to separate the panel from the body and not easy to control the force at a right value. Furthermore, the panel is easy to be damaged after many times deviation from the body A replaceable panel device for handset which has a simply structure, firm fixture and can be easily operated is desired.

SUMMARY OF THE INVENTION

Accordingly, an object of the present invention is to provide a replaceable panel device for handset which has a simply structure, firm fixture and can be easily operated.

To achieve the above object, a replaceable panel device in accordance with the present invention has a panel, a locking subassembly and a top cover. The panel has a mounting portion with a first groove and at least a first spring fixing portion. The locking subassembly is accommodated in the mounting portion of the panel and has a button and a spring. The button has a table, at least a second spring fixing portion and a locking portion. The spring has an elastic portion and two arms respectively extending from two ends of the elastic portion and respectively attaching with the second spring fixing portion of the locking subassembly and the first spring fixing portion of the panel. The top cover has a second groove which corresponds with the first groove of the panel. The locking portion of the button passes through the first groove of the panel and the second groove of the top cover, and mates with the second arc groove by the return force of the spring to fix the panel and the top cover together.

BRIEF DESCRIPTION OF THE DRAWINGS

Other objects, advantages and novel features of the present invention will be drawn from the following detailed description of two embodiments of the present invention with attached drawings, in which.

DETAILED DESCRIPTION OF PREFERRED EMBODIMENT

Figure 1:
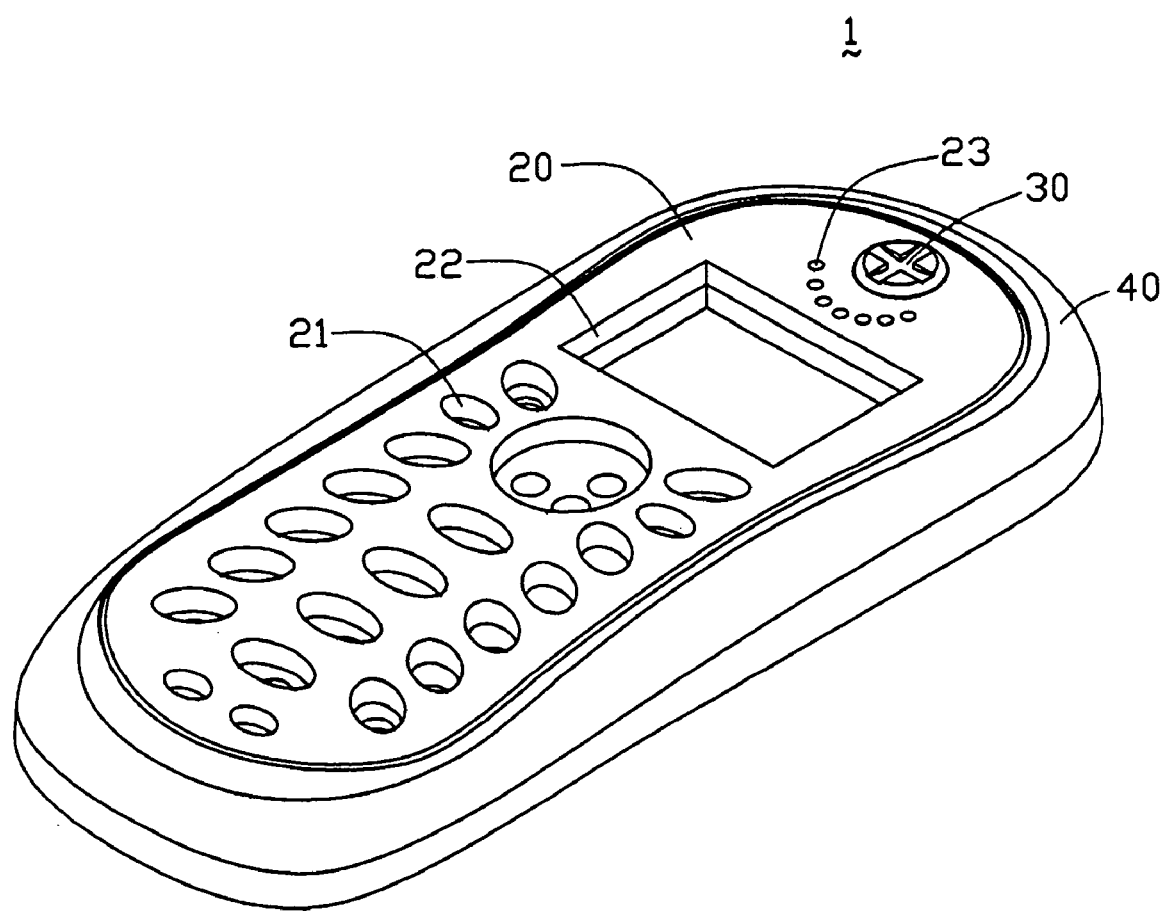
FIG. 1 is a perspective view of a replaceable panel device in accordance with a first embodiment of the present invention.

Referring to FIG. 1, a replaceable panel device 1 for a handset in accordance with a first embodiment of the present invention has a panel 20, a locking subassembly 30 and a top cover 40 of the handset. The panel 20 is mounted on the top cover 40 by the locking subassembly 30.

Figure 2:
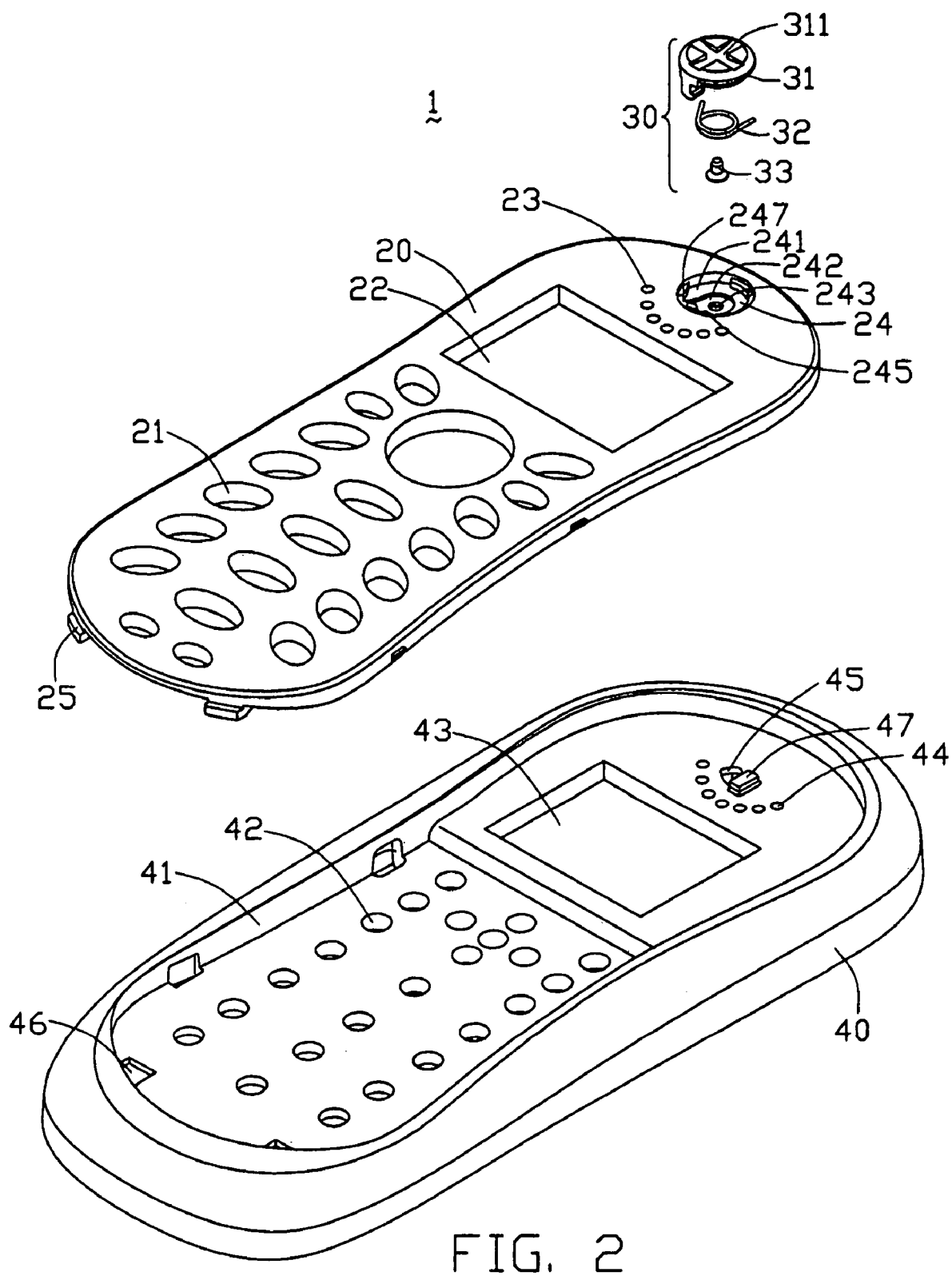
FIG. 2 is an exploded view of the replaceable panel device of the first embodiment of the present invention shown in FIG. 1.
Figure 3:
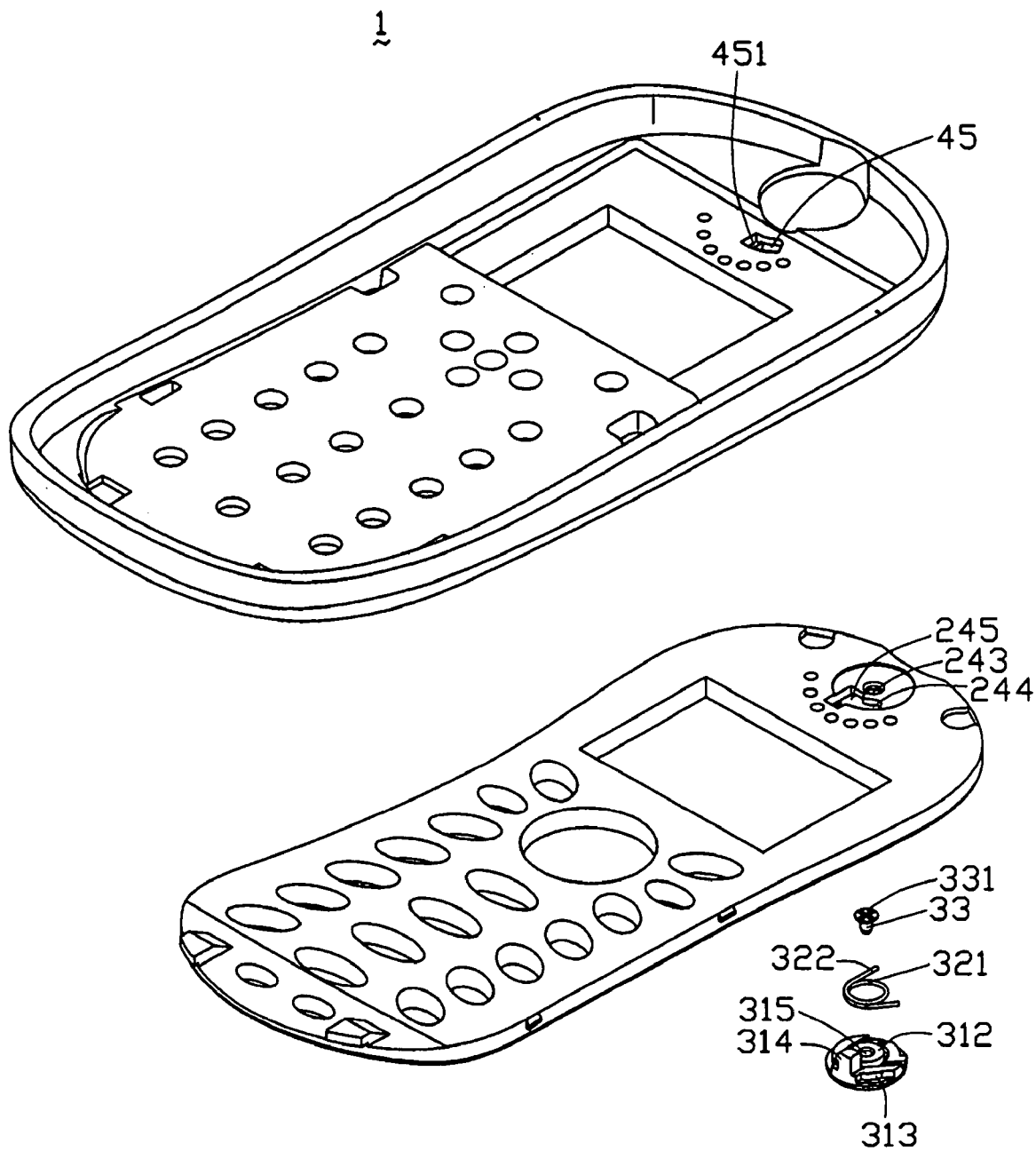
FIG. 3 is an exploded perspective view of the replaceable panel device of the first embodiment of the present invention shown in FIG. 1, from a reverse direction.

Also referring to FIGS. 2 and 3, the panel 20 of the replaceable panel device has a plurality of first keyholes 21, a first display window 22, a plurality of first earphone holes 23 and a mounting hole 24. The first display window 22 is defined at a middle of the panel 20. The first keyholes 21 are defined at a side of the display window 22. The first earphone holes 23 and the mounting hole 24 are defined at an opposite side of the display window 22. A plurality of protuberances 25 are defined at a peripheral of the panel 22. The mounting hole 24 has a first recess 241, a second recess 242, a through hole 243, a first arc groove 244 and an accommodation groove 245. The first recess 241, the second recess 242 and the through hole 243 are coaxial. A diameter of the first recess 241 is longer than that of the second recess 242, and a diameter of the second recess 242 is longer than that of the through hole 243. At least a protrude 247 is defined at an inner surface (not labeled) of the first recess 241 of the mounting hole 24. The first arc groove 244 and the accommodation groove 245 communicate each other. The first arc groove 244 and the accommodation groove 245 are located at a side of the through hole 243, and run through the panel 20.

The locking subassembly 30 has a rotatable button 31, a first spring 32 and a pivot 33. A plurality of grooves 311 are defined on a first side surface of the rotatable button 31. A table 312 is perpendicularly extended from a center of an opposite second side surface of the rotatable button 31. The table 312 has a hole 315 defined therethrough. The table 312 is mounted in the second recess 242 of the panel 20, with the hole 315 communicating the through hole 243. A locking portion 314 and at least a first spring fixing portion 313 are extended from a peripheral of the second side surface of the table 31. The first spring 32 has an elastic portion 321 and two arms 322 extending from two side of the elastic portion 321. The elastic portion 321 rings an outer surface of the table 312 of the rotatable button 31. An arm 322 contacts with the first spring fixing portion 313 of the rotatable button 31. An outer diameter of the pivot 33 is less than an inner diameter of the through hole 243 of the mounting hole 24, and larger than an inner diameter of the hole 315 of the table 31. The pivot 33 runs through the through hole 243, and is engaged in the hole 315 of the table 31. The pivot 33 has a table portion 331, whose diameter is longer than that of the through hole 243 of the mounting hole 24.

The top cover 40 has a housing 41 for accommodating the panel 20. A plurality of second keyholes 42, a second display window 43, a plurality of second earphone holes 44 and a second arc groove 45 are defined on the top cover 40. The second keyholes 42, the second display window 43 and the second earphone holes respectively correspond to the first keyholes 21, the first display window 22 and the first earphone holes 23 of the panel 20. The housing 41 has a plurality of notches 46 for accommodating the corresponding protuberances 25 of the panel 20. The second arc groove 45 corresponds to the first arc groove 244 of the panel 20. A retainer 47 is extended from an end of the second arc groove 45, and partially accommodated therein. A rest 451 is formed between the retainer 47 and the second arc groove 45.

Figure 4:
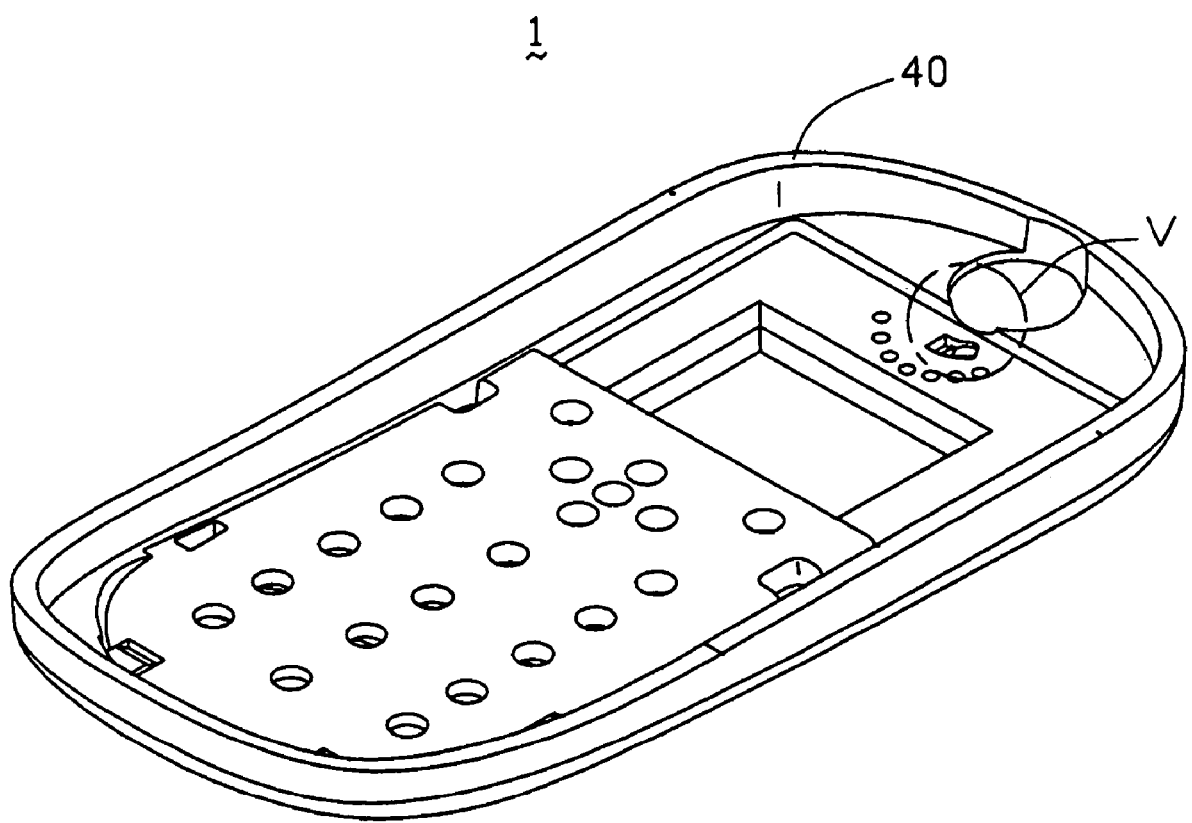
FIG. 4 is an assembly view of the replaceable panel device of the first embodiment of the present invention.
Figure 5:
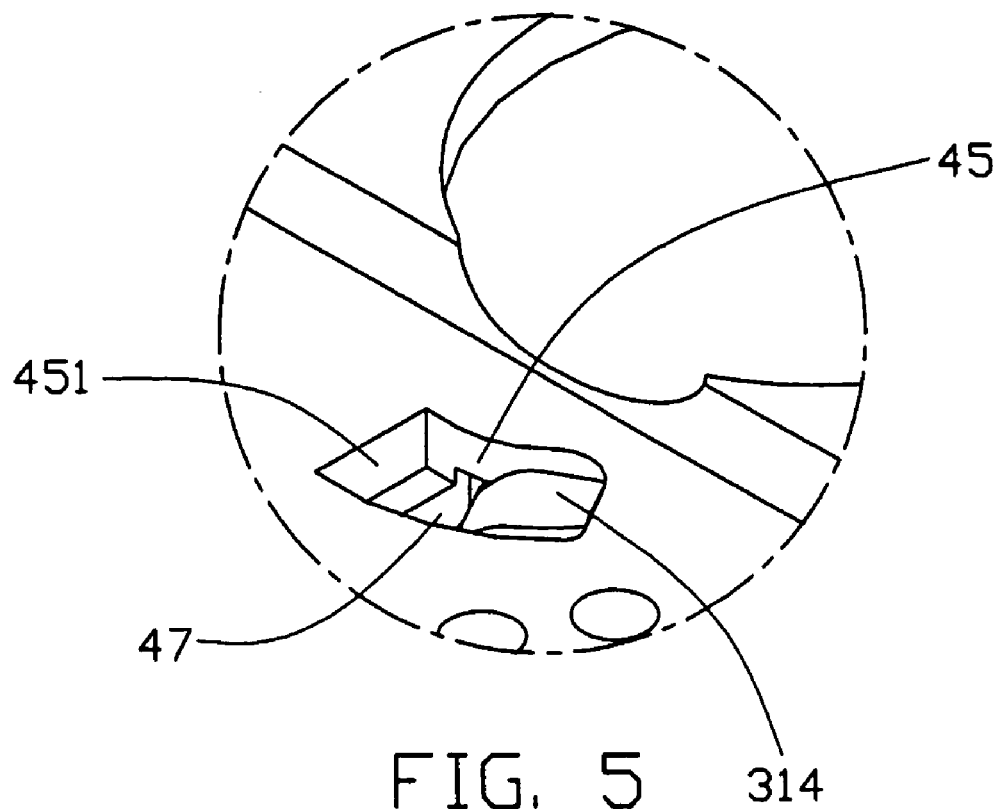
FIG. 5 is an enlarge view of a V portion of the replaceable panel device shown in FIG. 4, wherein the locking portion of the locking subassembly protrudes from the second arc groove of the top cover.
Figure 6:
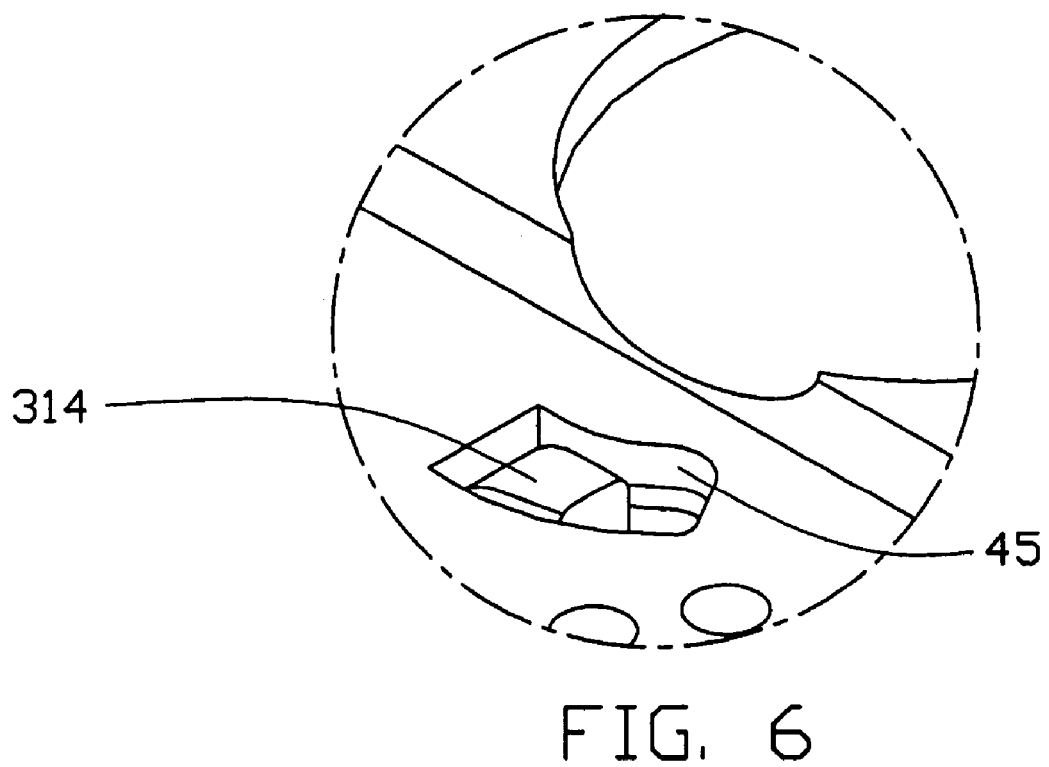
FIG. 6 is an enlarge view of the V portion of the replaceable panel device shown in FIG. 4, wherein the locking portion of the locking subassembly mates with a rest defined at a side of the second arc groove of the top cover.

Also referring to FIGS. 4–6, the panel 20 is assembled with the top cover 40. Firstly, the locking subassembly 30 is mounted in the mounting hole 24 of the panel 20. The table 312 and the first spring fixing portion 313 of the rotatable button 31 are respectively accommodated in the second recess 242 and the first recess 241 of the mounting hole 24. An arm 322 of the first spring 32 contacts with the protrude 247 of the first recess 241. The locking portion 314 of the locking subassembly 30 runs through and is accommodated in the accommodation groove 245 of the mounting hole 24. The pivot 33 passes through the through hole 243 of the mounting hole 24 and mates with the hole 315 of the rotatable button 31 to fix the locking subassembly 30 in the mounting hole 24 of the panel 20.

Secondly, the panel 20 is mounted on the top cover 40. The panel 20 is accommodated and fixed in the housing 41 of the top cover 40 by the mate of the notch 46 of the top cover 40 and the protuberance 25 of the panel 20. Rotating the rotatable button 31 to make the locking portion 314 leave the accommodation groove 245 and enter into the first arc groove 244. The locking portion 314 runs through the first arc groove 244 and the second arc groove 45, and the retainer 47 is accommodated in the accommodation groove 245 of the panel 20. The locking portion 314 moves to an end of the second arc groove 45 by the return force of the first spring 32. Finally, an end of the locking portion 314 is locked in the rest 451 to fix the panel 20 and the top cover 40 together.

When deviating the panel 20 from the top cover 40, an operator rotates the rotatable button 31 to a predetermined angle, makes the locking portion 314 apart from the rest 451 and sliding in the second arc groove 45. Then, the operator overturns the handset to make the panel under the top cover. Thus, the panel is separate from the top cover by the effect of the gravity of the panel.

Figure 7:
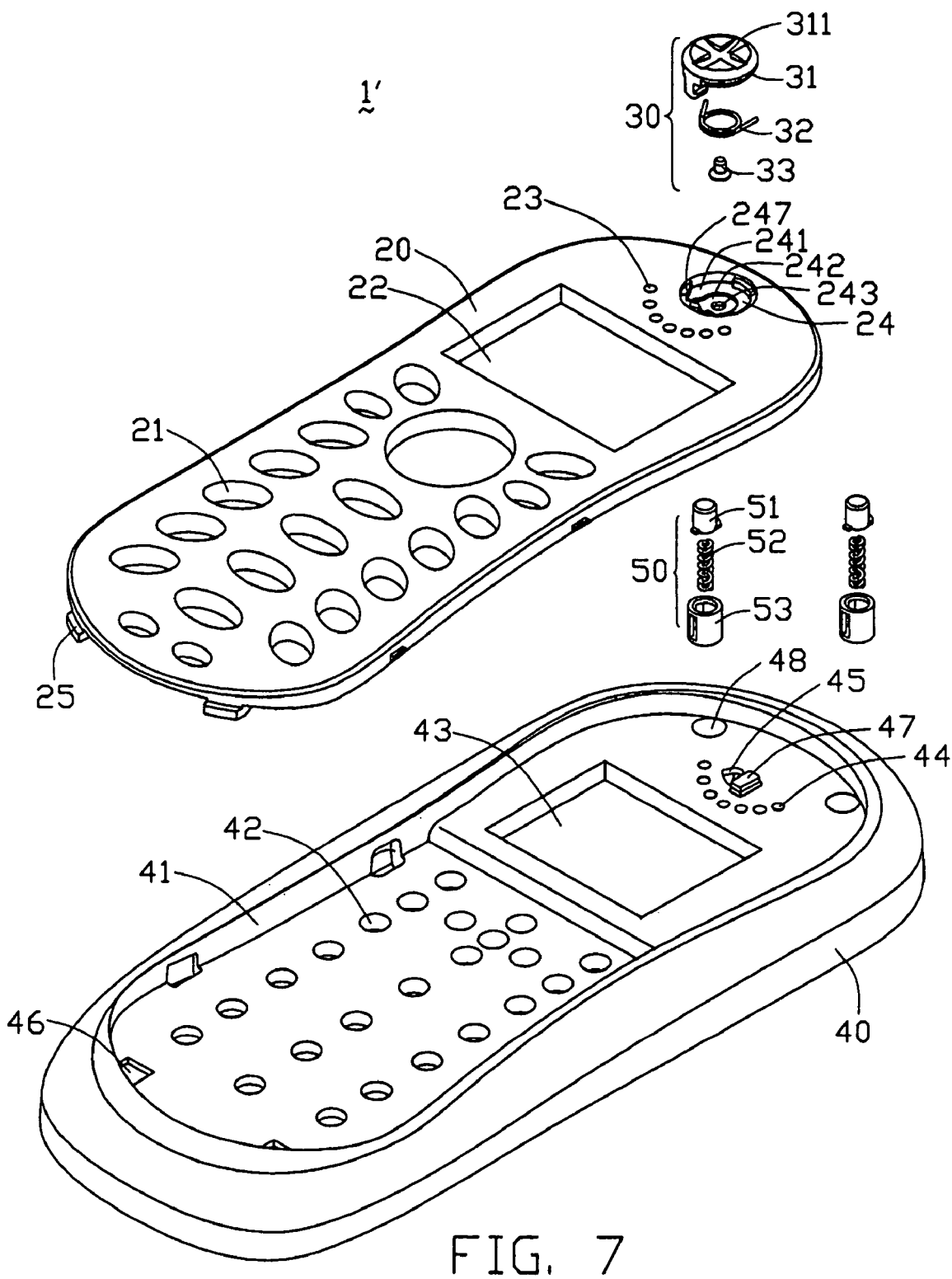
FIG. 7 is an exploded view of the replaceable panel device of a second embodiment of the present invention.
Figure 8:
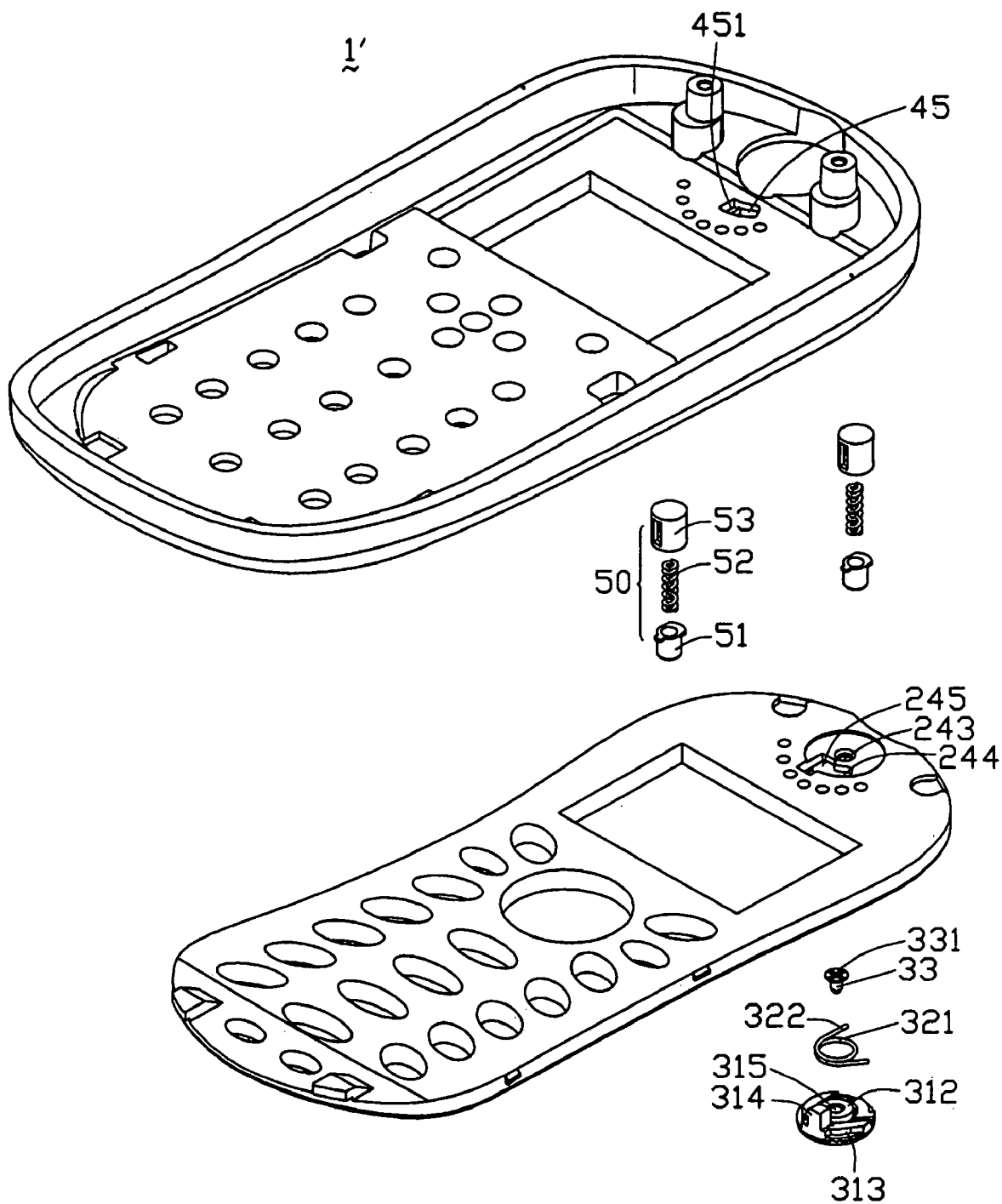
FIG. 8 is an exploded view of the replaceable panel device of the second embodiment of the present invention, from a reverse direction.
Figure 9:
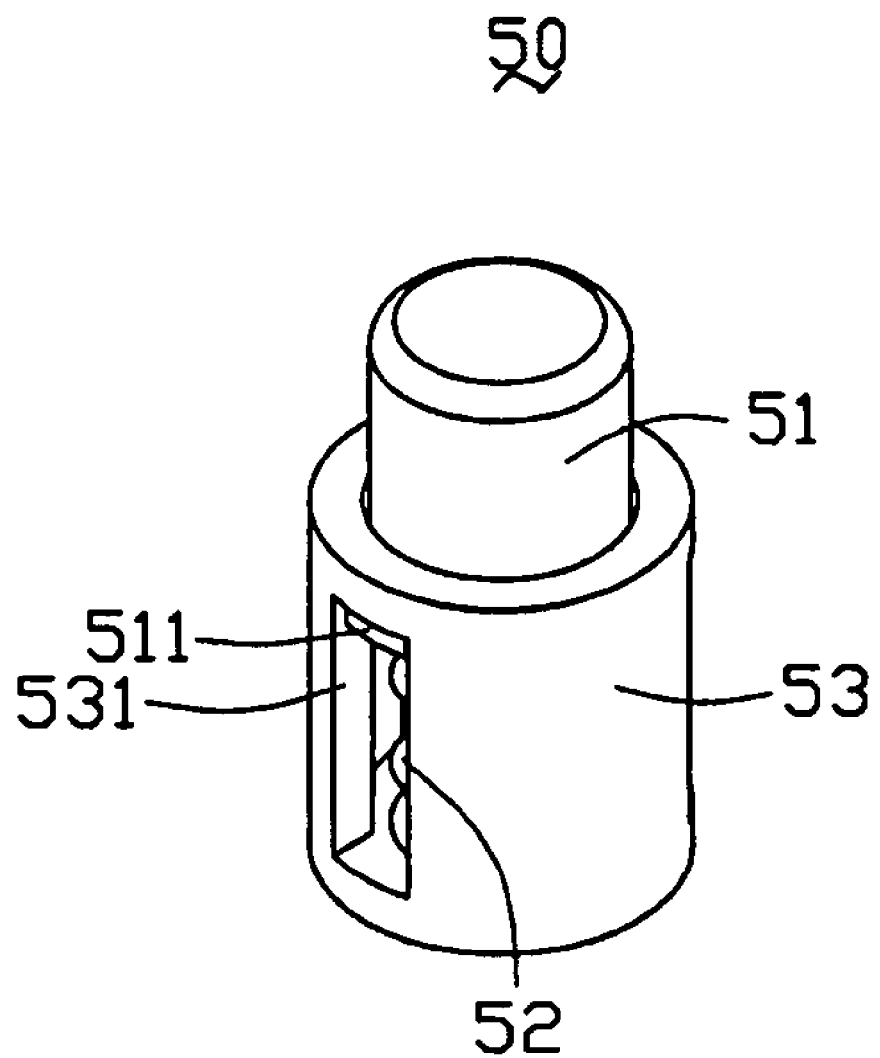
FIG. 9 is a perspective view of an elastic subassembly shown in FIG. 7.

Referring to FIGS. 7–9, a replaceable panel device 1' in accordance with a second embodiment of present invention is disclosed. The replaceable panel device 1' is substantially identical with the replaceable panel device 1 except at least an elastic subassembly 50 mounted between the panel 20 and the top cover 40. The elastic subassembly 50 has a top cap 51, a second spring 52 and a bottom cap 53. The top cap 51 and the bottom cap 53 are hollow and respectively have an opening at an end thereof. A plurality of clips 511 are extended from an outer surface of the opening of the cover 51. A plurality of slots 531 are defined on the bottom cap 53 for accommodating the clips 511 of the top cap 51. The top and bottom caps 51, 53 mate together to accommodate the second spring 52 therebetween. The top cap 51 is accommodated in the bottom cap 53 with the clips 511 of the top cap 51 freely sliding in the slots 531 of the bottom cap 53. The bottom cap 53 of the elastic subassembly 50 is accommodated in a cavity 48 of the top cover 40.

The assembly process of the replaceable panel device 1' is the same as that of the replaceable panel device 1 as described above. In the disassembly process of the replaceable panel device 1', the rotatable button 31 is rotated to a predetermined angle, and the locking portion 314 is apart from the rest 451 and moves into the second arc groove 45. The top cap 51 moves toward the panel 20 for the return force of the second spring 52 of the elastic subassembly 50 and pushes the panel 20 separate from the top cover 40. It is obviously that the elastic subassembly 50 can be integrated with the top cover 40.

It is obvious that the retainer 47 of the top cover 40 and the accommodating groove 245 of the panel 20 can be omitted to make the locking portion 314 of the locking subassembly directly mate with an end of the second arc groove 45 of the top cover 40. Also, the pivot 33 of the locking subassembly 30, the through hole 243 of the panel 20 and the hole 315 of the table 312 can be omitted to make the rotatable button 31 rotate around the table 312 in the second recess 242.

Compared with the convention replaceable panel device, the replaceable panel device 1, 1' has the panel 20 and the top cover 40 assembled by the locking subassembly 30 with a rotatable button 31 and a first spring 32. Rotating the rotatable button 31 to a predetermined angle, the panel 20 can be easily separate from the top cover 40 for the effect of the gravity of the panel 20. By the mating of the locking portion of the locking subassembly and the rest of the top cover, the panel is firmly fixed on the top cover.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. A replaceable panel device for a handset comprising:
   a panel with a mounting portion which comprises a first groove and at least a first spring fixing portion;
   a locking subassembly which is accommodated in the mounting portion of the panel, the locking subassembly comprising a button and a first spring, said button comprising a table, at least a second spring fixing portion and a locking portion, said first spring comprising an elastic portion and two arms respectively extending from two ends of the elastic portion, the two arms respectively attaching with the second spring fixing portion of the locking subassembly and the first spring fixing portion of the panel; and
   a top cover with a second groove which corresponds with the first groove of the panel;
   wherein, the locking portion of the button passes through the first groove of the panel and the second groove of the top cover, and mates with the second groove by a return force of the first spring to fix the panel and the top cover together.

2. The replaceable panel device in accordance with claim 1, wherein the mounting portion comprises a first recess and a second recess which is coaxial with the first recess.

3. The replaceable panel device in accordance with claim 2, wherein at least a protrude is defined in the first recess.

4. The replaceable panel device in accordance with claim 3, wherein the table of the button is rotatablely accommodated in the second recess.

5. The replaceable panel device in accordance with claim 4, wherein the mounting portion of the panel has a through hole coaxial with the second recess.

6. The replaceable panel device in accordance with claim 5, wherein the table of the button has a hole defined in a center thereof.

7. The replaceable panel device in accordance with claim 6, wherein the locking subassembly further comprises a pivot, an outer diameter of the pivot is less than an inner diameter of the through hole of the mounting portion of the panel, and larger than an inner diameter of the hole of the table of the button.

8. The replaceable panel device in accordance with claim 7, wherein the pivot passes through the through hole of the mounting portion, and mates with the hole of the table of the button.

9. The replaceable panel device in accordance with claim 8, wherein the pivot further comprises a table portion defined an end thereof, an outer diameter of the table portion is larger than the inner diameter of the through hole of the mounting portion of the panel.

10. The replaceable panel device in accordance with claim 1, wherein the second groove of the top cover further comprises a retainer partially accommodated in an end of the groove, and a rest is formed between the retainer and the second groove for mating with the locking portion of the button.

11. The replaceable panel device in accordance with claim 10, wherein the panel further comprises an accommodation groove for accommodating the retainer.

12. The replaceable panel device in accordance with claim 11, wherein the accommodation groove and the first groove of the panel communicate each other.

13. The replaceable panel device in accordance with claim 1, wherein the panel further comprises a plurality of protuberances defined a peripheral thereof.

14. The replaceable panel device in accordance with claim 13, wherein the top cover further comprises a housing for accommodating the panel.

15. The replaceable panel device in accordance with claim 14, wherein the housing of the top cover has a plurality of notches defined outside edge thereof, for accommodating the corresponding protuberances of the panel.

16. The replaceable panel device in accordance with claim 1, wherein the top cover further comprises an elastic subassembly which comprises a top cap, a second spring and a bottom cap.

17. The replaceable panel device in accordance with claim 16, wherein the top and bottom caps are hollow and respectively have an opening at an end thereof, the top and bottom caps mate together and accommodate the spring therebetween.

18. The replaceable panel device in accordance with claim 17, wherein the top cap has a plurality of clips extend from an outer surface of the opening thereof, the bottom cap has a plurality of slots for accommodating the corresponding clips.

19. The replaceable panel device in accordance with claim 18, wherein the top cover further comprises a cavity for accommodating the bottom cap of the elastic subassembly.

20. The replaceable panel device in accordance with claim 18, wherein the bottom cap is integrated with the top cover.

21. An replaceable panel device for a handset comprising:
a panel with a mounting portion which comprises a first groove and at least a first spring fixing portion;
a locking subassembly which is accommodated in the mounting portion of the panel, the locking subassembly comprising a button and a first spring, said button comprising a table, at least a second spring fixing portion and a locking portion, said first spring comprising an elastic portion and two arms respectively extending from two ends of the elastic portion, the two arms respectively attaching with the second spring fixing portion of the locking subassembly and the first spring fixing portion of the panel; and
a top cover comprising a second groove, an elastic subassembly and a cavity, said second groove being corresponds with the first groove of the panel, said elastic subassembly being partially accommodated in the cavity;
wherein, the locking portion of the button passes through the first groove of the panel and the second groove of the top cover, and mates with the second groove by a return force of the first spring to fix the panel and the top cover together.

22. The replaceable panel device in accordance with claim 21, wherein the elastic subassembly comprises a top cap, a second spring and a bottom cap.

23. The replaceable panel device in accordance with claim 22, wherein the top and bottom caps are hollow and respectively and an opening at an end thereof, the top and bottom caps mate together and accommodate the second spring therebetween.

24. The replaceable panel device in accordance with claim 23, wherein the top cap has a plurality of clips extend from an outer surface of the opening thereof, and the bottom cap has a plurality of slots for accommodating the corresponding clips.

25. The replaceable panel device in accordance with claim 24, wherein the cavity accommodates the bottom cap of the elastic subassembly.

26. A panel-replaceable device for a handset comprising:
a top cover defining an upward opening whose dimension is essentially equal to a main area of said top cover;
a notch formed in one lengthwise end of the top cover;
a locking retainer formed around the other lengthwise end of the top cover;
a panel received in the upward opening and dimensionally configured similar to said upward opening;
a protrusion formed on one lengthwise end of the panel for receipt in the notch;
a locking assembly retained on the other end of said panel, and including a rotatable button constantly urged by a biasing device to lock to the locking retainer so as to assure the panel is fastened to the top cover in a direction essentially perpendicular to a main plane of the panel under a condition that a circumference of said panel is surrounded by the top cover; wherein during replacement, the rotatable button is rotated to resist resilient force derived from the biasing device for disengaging the rotatable button from the locking retainer so as to allow the panel to be removed from the top cover in a tilted manner about a rotation axis which is close to the engaged protrusion and the notch.

27. The device in accordance with claim 26, further including another biasing device located at the other lengthwise end of the top cover to constantly urge the other lengthwise end of the panel for upwardly pushing the panel away from the top cover.

* * * * *